(12) United States Patent
Gordon

(10) Patent No.: US 6,324,217 B1
(45) Date of Patent: Nov. 27, 2001

(54) METHOD AND APPARATUS FOR PRODUCING AN INFORMATION STREAM HAVING STILL IMAGES

(75) Inventor: Donald F. Gordon, Pacific Grove, CA (US)

(73) Assignee: DIVA Systems Corporation, Redwood City, CA (US)

( * ) Notice: Subject to any disclaimer, the term of this patent is extended or adjusted under 35 U.S.C. 154(b) by 0 days.

(21) Appl. No.: 09/111,576

(22) Filed: Jul. 8, 1998

(51) Int. Cl.[7] .................................................. H04N 7/18
(52) U.S. Cl. ................................ 375/240.28; 375/240.16
(58) Field of Search ..................................... 348/7, 8, 9, 10, 348/11, 13, 463, 464, 465, 462, 845.1, 845.2, 845.3; 375/240.12, 240.13, 240.14, 240.15, 240.16, 240.17, 240.26, 240.27, 240.28

(56) References Cited

U.S. PATENT DOCUMENTS

| | | | |
|---|---|---|---|
| 5,867,208 | * 2/1999 | McLaren | 348/13 |
| 6,005,562 | * 12/1999 | Shiga et al. | 348/10 |
| 6,091,460 | * 7/2000 | Hatano et al. | 375/240.12 |
| 6,125,140 | * 9/2000 | Wilkinson | 375/240.14 |
| 6,141,385 | * 10/2000 | Yamaji | 375/240.27 |

* cited by examiner

Primary Examiner—Andy Rao
(74) Attorney, Agent, or Firm—Moser, Patterson & Sheridan, LLP

(57) ABSTRACT

A method and apparatus for processing an image to produce an encoded video information stream comprising a sequence of replicated group of picture (GOP) information structures, each GOP including an intra-coded frame (I-frame) and a plurality of forward predictive coded frames (P-frames), wherein the I-frame of the initial GOP is formed by intra-coding the still image. Optionally, the encoded video information stream is multiplexed with an encoded audio information stream to produce a system stream suitable for use in an MPEG-like information processing system.

21 Claims, 3 Drawing Sheets

METHOD AND APPARATUS FOR PRODUCING AN INFORMATION STREAM HAVING STILL IMAGES

The invention relates to information distribution systems and, more particularly, the invention relates to a method of generating an information stream, such as a movie information stream, suitable for use in an information distribution system.

BACKGROUND OF THE DISCLOSURE

In several communications systems the data to be transmitted is compressed so that the available bandwidth is used more efficiently. For example, the Moving Pictures Experts Group (MPEG) has promulgated several standards relating to digital data delivery systems. The first, known as MPEG-1 refers to ISO/IEC standards 11172 and is incorporated herein by reference. The second, known as MPEG-2, refers to ISO/IEC standards 13818 and is incorporated herein by reference. A compressed digital video system is described in the Advanced Television Systems Committee (ATSC) digital television standard document A/53, and is incorporated herein by reference.

The above-referenced standards describe data processing and manipulation techniques that are well suited to the compression and delivery of video, audio and other information using fixed or variable length digital communications systems. In particular, the above-referenced standards, and other "MPEG-like" standards and techniques, compress, illustratively, video information using intra-frame coding techniques (such as run-length coding, Huffman coding and the like) and inter-frame coding techniques (such as forward and backward predictive coding, motion compensation and the like). Specifically, in the case of video processing systems, MPEG and MPEG-like video processing systems are characterized by prediction-based compression encoding of video frames with or without intra- and/or inter-frame motion compensation encoding.

Information distribution systems utilizing information streams conforming to the above standards or subsets of the above standards are known. For example, an interactive digital video on demand (VOD) service known as the OnSet™ system is manufactured by DIVA Systems Corporation of Menlo Park, Calif. The OnSet™ system distributes audio-visual information to individual subscribers utilizing MPEG-like information streams. The OnSet™ system also allows subscribers to interactively control the delivery of audio-visual information using consumer-friendly commands, such as fast-forward (FF), rewind (REW), pause (PAUSE), play (PLAY) and the like.

The OnSet™ system utilizes additional information streams to provide a so-called movie information screen (MIS) feature to subscribers. The MIS feature comprises a substantially motionless image, such as from a movie or other audio-visual program, displayed on a subscriber's display device. The MIS, which is typically accompanied by a related audio track, functions as a "barker" tending to induce impulse subscriber purchases of the movie or other audio-visual program.

Unfortunately, existing methods for generating MIS information streams disadvantageously require extensive encoding of video information to produce well-behaved bitstreams, i.e., bitstreams that do not cause decoder buffer underflow or overflow. For example, an MIS information stream generated by repeatedly encoding an image will produce a well-behaved MIS bitstream at the cost of significant computational resources and time (e.g., two to 30 minutes to encode a two minute MIS display or presentation).

Therefore, it is seen to be desirable to provide a rapid, computationally efficient method for generating well-behaved MIS information streams.

SUMMARY OF THE INVENTION

The invention comprises a method and apparatus for processing an image to produce an encoded video information stream comprising a sequence of replicated group of picture (GOP) information structures, each GOP including an intra-coded frame (I-frame) and a plurality of forward predictive coded frames (P-frames), wherein the I-frame of the initial GOP is formed by intra-coding the still image, and each P-frame comprises, e.g., a substantially zero motion vector P-frame. Optionally, the encoded video information stream is multiplexed with an encoded audio information stream to produce a system stream suitable for use in an MPEG-like information processing system. The invention generates standards compliant, MPEG-like bitstreams suitable for implementing, e.g., the above-described movie information screen (MIS) feature.

Specifically, a method according to the invention for processing an image to produce a compressed information stream comprises the steps of: intra-coding the image to produce an intra-coded information frame (I-frame); associating the intra-coded information frame with a plurality of forward predicted information frames (P-frames) to form a group of pictures (GOP); and replicating the GOP to produce the compressed information stream.

An apparatus according to the invention for processing an image to produce an MPEG-like information stream comprises: a frame encoder, for producing an intra-coded (I-frame) in response to said image, and for producing N number of forward predicted information frames (P-frames) in response to said I-frame, where N is an integer; a memory, for storing said I-frame and said N number of P-frames; and a controller, for causing said memory to repetitively output said I-frame and said N number of P-frames as a video elementary stream.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention will be described within the context of a movie information screen (MIS) generator suitable for processing, e.g., a still image to produce a standards compliant (e.g., MPEG1, MPEG2 and the like) or near-compliant information stream which, when decoded and presented in a standard manner, will produce a still image on a display device. Optionally, an audio signal or stream is encoded and multiplexed with the standards compliant information stream. It will be readily recognized by those skilled in the art that the teachings of the present invention have a much broader applicability. For example, the present invention may be advantageously employed to efficiently encode very low frame rate video images in, e.g., video telephony and other applications.

Figure 1:
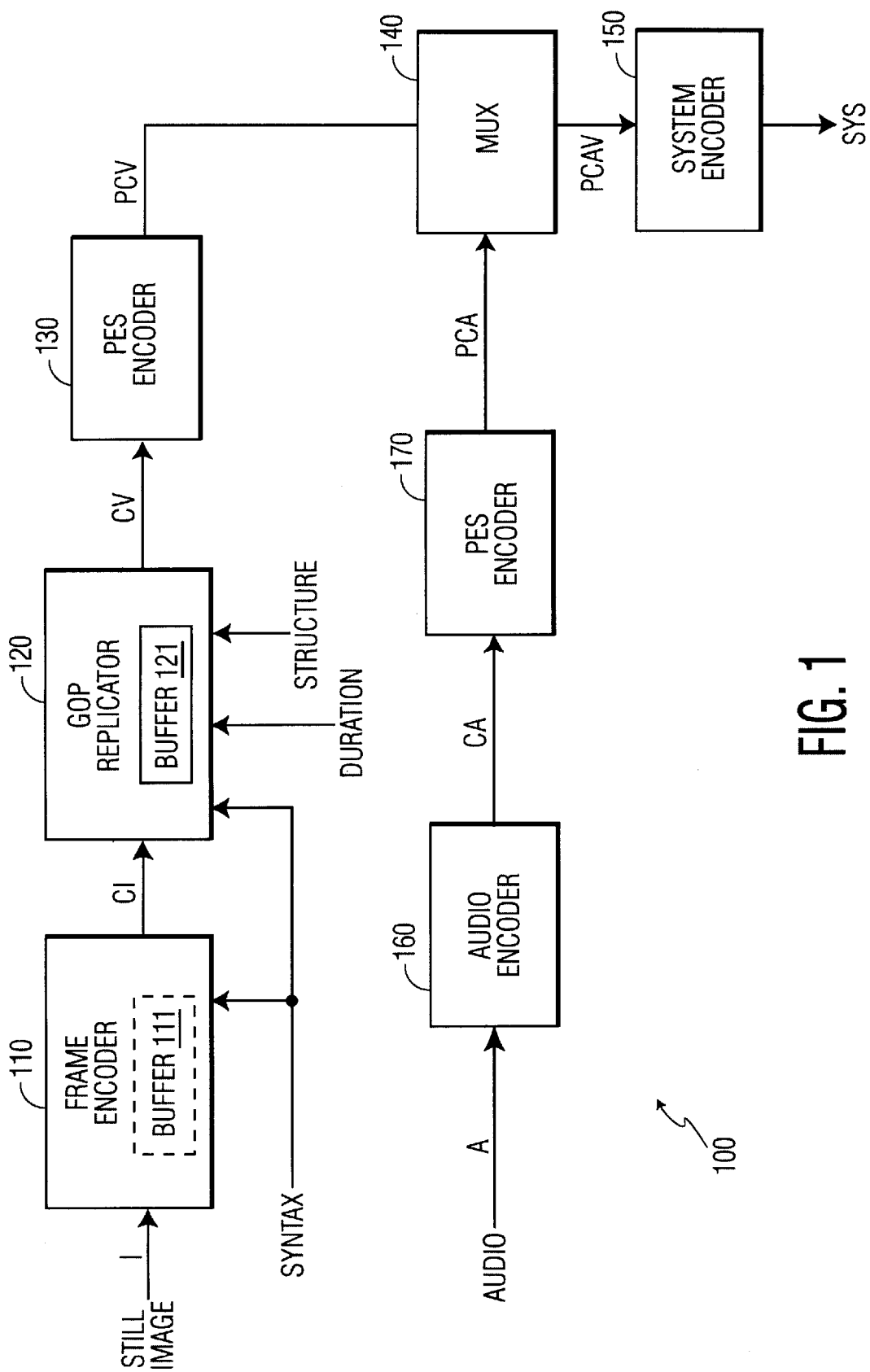
FIG. 1 shows a block diagram of an information stream processing system according to the invention.

FIG. 1 depicts a movie information screen (MIS) generator including apparatus according to the invention. Specifically, the apparatus of FIG. 1 comprises a frame encoder 110, a GOP replicator 120, a first packetized elementary stream (PES) encoder 130, a multiplexer 140, a system encoder 150, an audio encoder 160 and a second PES encoder 170.

Frame encoder 110, illustratively an MPEG1 or MPEG2 video encoder, receives an image signal I, illustratively a still image information signal. The frame encoder 110 intra-codes the image signal I to produce a still image representative, intra-coded information frame (I-frame). The still image representative I-frame is coupled to GOP replicator 120, where it is stored in a buffer 121. Optionally, the still image representative I-frame is stored in a buffer 111 within frame encoder 110.

Frame encoder 110 is responsive to a control signal SYNTAX produced by, e.g., a controller (not shown). The control signal SYNTAX is used to adapt video syntax parameters of the encoded image signal. For example, the SYNTAX signal may be used to define an appropriate video format (e.g., 4:2:0, 4:2:2), chromaticity, vertical frame size, horizontal frame size and the like.

GOP replicator 120 utilizes the still image representative I-frame as an anchor frame for a GOP data structure. The GOP data structure formed by the GOP replicator 120 comprises the still image representative I-frame followed by a plurality of NULL forward predictive coded frames (P-frames). A NULL forward predictive coded frame comprises a "zero motion vector frame (i.e., a P-frame having relatively inconsequential motion vectors) based on an anchor frame, e.g., the still image representative I-frame. Thus, each NULL P-frame, when decoded, will produce a picture that is virtually identical to the anchor frame from which it is based.

The GOP replicator 120, after forming an initial GOP structure, proceeds to replicate that GOP structure to produce a video elementary stream CV. In the case of the GOP structure comprising the still image representative I-frame followed by a plurality of NULL P-frames, a decoder will produce a video elementary stream CV that, when displayed, depicts a "freeze frame" of the still image.

It must be noted that the GOP replicator 120 also includes the video stream syntax within video elementary stream CV necessary to produce a standards compliant stream. To further refine this operation, the GOP replicator is responsive to three control signals produced by, e.g., a controller (not shown).

The first control signal, STRUCTURE, is used to define the type of GOP structure formed by the GOP replicator. For example, the STRUCTURE control signal may be used to cause the GOP replicator to produce a GOP structure comprising an I-frame followed by 14 NULL P-frames.

The second control signal, DURATION, is used to define the temporal duration of the video elementary stream CV produced by the GOP replicator 120. For example, the DURATION control signal may be used to cause the GOP replicator to produce, e.g., a 10 minute video clip of the input image.

The third control signal, SYNTAX, is used to adapt the video syntax parameters of the GOP structure. For example, the SYNTAX signal may be used to define an appropriate frame rate such that subsequent processing by the first packetized elementary stream (PES) encoder produces a packetized compressed video stream including appropriate presentation time stamps (PTS) and/or decode time stamps (DTS). It must be noted that in the absence of defined syntax values, default values (e.g., a default frame rate) are usually assumed and utilized in, e.g., a far end decoder. These default syntax values may vary from standard to standard and may, in some cases, be modified within a particular system. For example, each frame within the GOP structure is intended to be displayed at a time determined by the frame rate of the video stream. In the case of a standard digital television system, such as the ATSC system, that frame rate is typically 30 frames per second (FPS) or 29.97 fps. In an MPEG1 or MPEG2 compliant system, a frame rate code may be inserted into a sequence header preceding the I-frame in the GOP structure.

The first packetized elementary stream (PES) encoder 130 processes the compressed video elementary stream CV in a standard manner to produce a packetized compressed video stream PCV, i.e., a video PES. The video PES PCV is coupled to a multiplexer 140.

Optional audio encoder 160 encodes an audio signal A in a standard manner to produce a compressed audio elementary stream CA. The optional audio encoder comprises, e.g., an MPEG1 audio encoder, a Dolby AC-3 encoder, a perceptual audio encoder (PAC) and the like. For example, optional audio encoder 160 may receive an audio information stream comprising an audio track suitable for presentation along with the still image as a movie information screen (MIS).

The second packetized elementary stream (PES) encoder 170 processes the compressed audio elementary stream CA in a standard manner to produce a packetized compressed audio stream PCA, i.e., an audio PES. The audio PES PCA is coupled to multiplexer 140.

Multiplexer 140 multiplexes the video PES PCV and, optionally, the audio PES PCA in a standard manner to produce a packetized audio-video stream PCAV (e.g., an MPEG1 or MPEG2 program stream). The packetized audio-video stream PCAV is coupled to the system encoder 150.

The system encoder 150 encodes the packetized audio-video stream PCAV in a standard manner to produce a system stream SYS, illustratively an MPEG1 or MPEG2 system stream.

In the above-described apparatus 100, the GOP replicator 120 utilizes the insertion of N NULL P-frames, where N is an integer, after an I-frame to form a GOP. In this embodiment of the invention each of the NULL P-frames comprises a pre-defined data structure that is simply inserted into the appropriate memory location following the stored I-frame. In the case of an MPEG2 information stream, a NULL frame utilized by the inventor comprises a 38 byte data structure that informs the decoder to utilize all the macroblocks from the previous anchor frame and to do so without displacing the macroblocks (i.e., zero motion vectors). In essence, the NULL P-frames are interpreted by a decoder as "repeat last anchor frame" commands.

In another embodiment of the invention, the frame encoder 110 actually performs a predictive encoding operation for each of the N P-frames that form the initial GOP structure. In this embodiment, the frame encoder 110 used to provide the I-frame and the N P-frames that form the GOP, while the GOP replicator is only used to replicate the formed GOP. In this manner, the GOP replicator function may be performed using a standard first-in first-out (FIFO) buffer.

Figure 2:
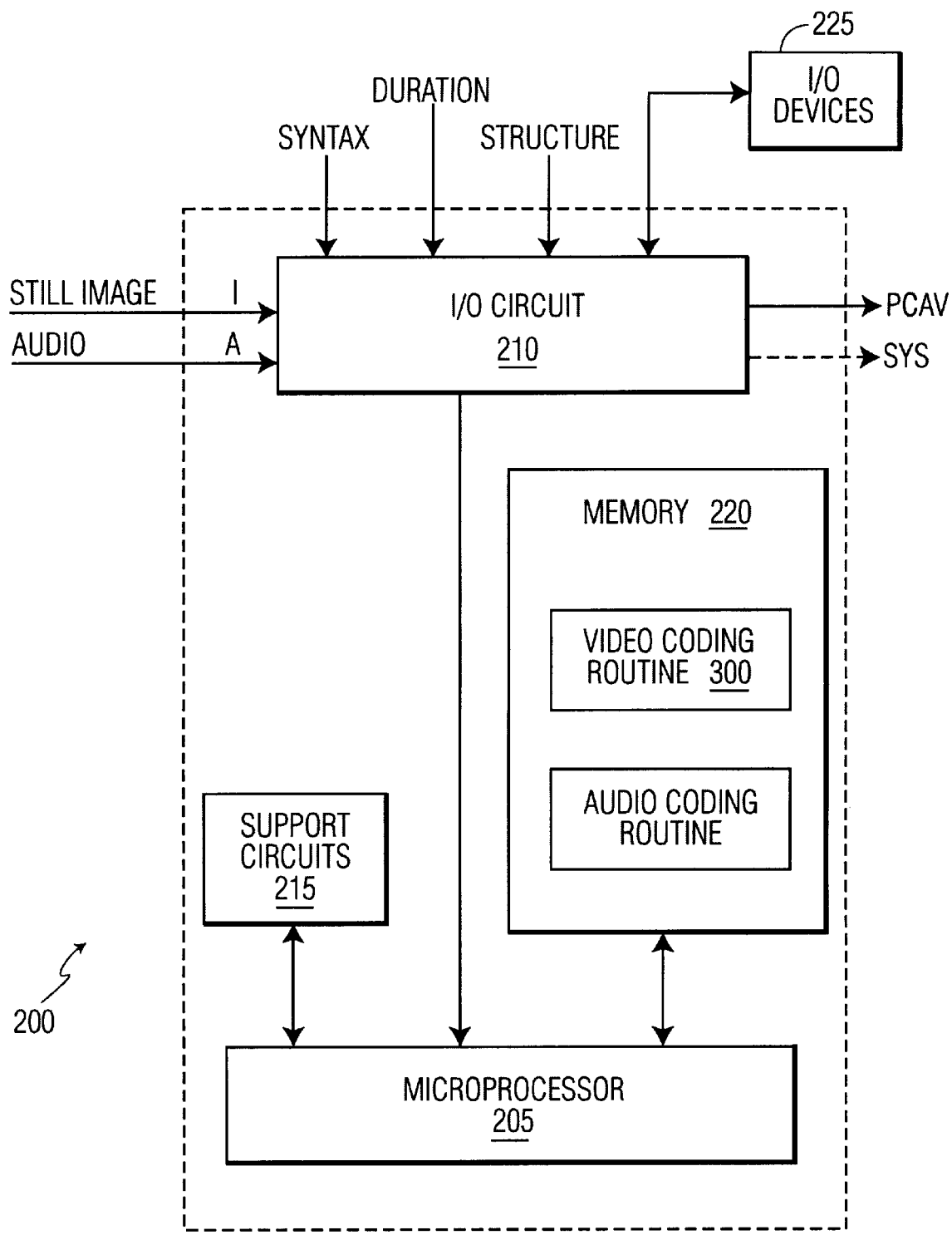
FIG. 2 shows a flow diagram of a process for generating information sub-streams according to the invention and suitable for use in the information stream processing system of FIG. 1.

FIG. 2 depicts an alternate embodiment of the movie information screen (MIS) generator of FIG. 1. Specifically, the embodiment of FIG. 2 comprises a general purpose computer including a microprocessor 205 as well as memory 220 for storing a video coding routine 300 according to the invention, a standard audio coding routine and, optionally, a standard system encoding routine.

The microprocessor 205 cooperates with conventional support circuitry 215 such as power supplies, clock circuits, cache memory and the like as well as circuits that assist in executing the software routines. As such, it is contemplated that some of the process steps discussed herein as software processes may be implemented within hardware, e.g., as circuitry that cooperates with the microprocessor 205 to perform various steps. The MIS generator 120 also contains input/output circuitry 210 that forms an interface between conventional input/output (I/O) devices 225, such as a keyboard, mouse, and display as well as an interface to a source of the image signal I, illustratively a still image information signal. Optionally, the input/output circuitry 210 forms an interface to a source of the audio signal A.

Although the MIS generator 200 is depicted as a general purpose computer that is programmed to control the generation of an information stream in accordance with the present invention, the invention can be implemented in hardware as an application specific integrated circuit (ASIC). As such, the process steps described herein are intended to be broadly interpreted as being equivalently performed by software, hardware, or a combination thereof.

The MIS generator 200 of the present invention executes a video coding routine 300 that intra-codes a received image, forms a group of pictures (GOP) utilizing the encoded image and a plurality of NULL forward predictive frames, and replicates the formed GOP structure to produce a standard-compliant information stream, such as an MPEG1 or MPEG2 program stream (PCAV) or system stream (SYS).

The MIS generator of the present invention is responsive to the SYNTAX, DURATION and STRUCTURE control signal as previously described with respect to FIG. 1. However, these control signals may also be received via, e.g., I/O devices 225 such as a keyboard or communication link.

Figure 3:
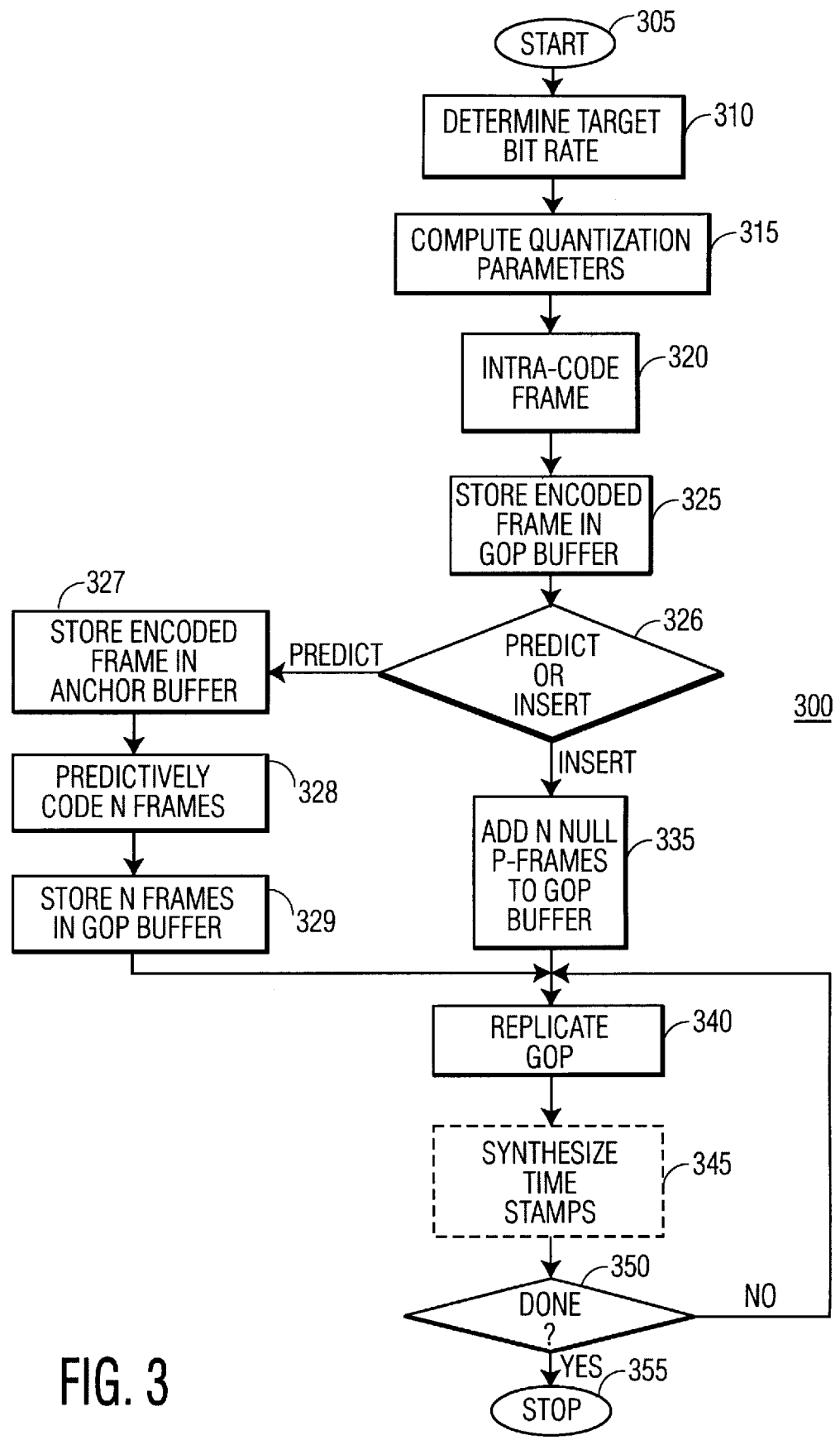
FIG. 3 shows a flow diagram of an information frame selection and decode routine according to the invention and suitable for use in the information sub-stream generating process of FIG. 2 and the information stream processing system of FIG. 1.

FIG. 3 depicts a flow diagram of a video coding routine 300 suitable for use in the apparatus of FIG. 1 and the alternate apparatus of FIG. 2. Specifically, the video coding routine 300 of FIG. 3 operates to generate an MPEG1, MPEG2 or other standards compliant or near compliant bitstream using an information frame I (e.g., a still image input frame).

The routine 300 is entered at step 305, when a still image is received, by, e.g., frame encoder 110 or I/O circuit 210.

The routine 300 proceeds to step 310, where a target bit rate is determined. The target bit rate is the maximum number of bits per second that a subsequently produced MPEG1 or MPEG2 bitstream may have. The target bit rate is related to the data rate used in a channel to transmit the bitstream, and may be fixed or may be variable. For example, consider the case of a system utilizing a 3.3 Mbps system stream comprising a 2.7 Mbps or 192 Kbps video stream and a Dolby AC-3 audio stream. The target bitrate is determined in a standard manner by subtracting, from the system bitrate (less a safety margin), a bitrate metric associated with the amount of video and audio data to be transmitted and any additional overhead information (e.g., header information) associated with the compression and packetizing standards utilized in forming the video and audio streams.

The routine 300 then proceeds to step 315, where quantization parameters are computed. Specifically, the routine computes the approximate maximum number of bits that can be allocated to each frame in a group of pictures. In the exemplary embodiment, a group of pictures comprises an I-frame followed by 14 P-frames, where each P-frame is a NULL P-frame having a zero motion vector component. Thus, the GOP bit budget is utilized by 14 P-frames (approximately 38 bytes each), additional overhead information (a relatively constant amount) and a single I-frame. Thus, the quantization parameters are calculated based upon a maximal bit budget utilization for encoding the I-frame.

The routine 300 then proceeds to step 320, where the image signal I, illustratively a still image, is encoded as an I-frame using the quantization parameters calculated in step 315. The routine 300 then proceeds to step 325, where the encoded I-frame (or the original input frame I) is stored in a GOP buffer, illustratively, a buffer 121 within the GOP replicator 120.

The routine 300 then proceeds to step 326, where a query is made as to whether the N P-frames utilized in the formation of the GOP structure are to be predicted (using, e.g., the frame encoder) or inserted (i.e., NULL P-frame insertion). If the query at step 326 is answered in a manner indicating that the P-frames are to be inserted, then the routine 300 proceeds to step 335, where N NULL P-frames are added to the GOP buffer after the I-frame stored in the buffer at step 325. The routine 300 then proceeds to step 340.

If the query at step 326 is answered in a manner indicating that the P-frames are to be predicted, then the routine 300 proceeds to step 327, where the encoded I-frame is stored in, e.g., an anchor frame buffer 111 associated with the frame encoder 110. The routine 300 then proceeds to step 328, where the frame encoder performs N forward predictive operations utilizing the stored I-frame (or the original input frame I) to produce N NULL P-frames. The routine 300 then proceeds to step 329, where the N NULL P-frames are stored in the GOP buffer after the I-frame stored in the buffer at step 325. Thus, a single group of pictures (GOP) is produced comprising an I-frame followed by N P-frames. In the exemplary embodiment N is equal to 14, however, N can be any number. The routine 300 then proceeds to step 340.

It must be noted that an encoded I-frame may be stored in the anchor buffer 111 of the frame encoder 110, rather than an unencoded frame. This is because the resulting P-frame will still comprise, effectively, the otherwise inserted NULL P-frame. Predictive encoding of the NULL P-frames is not the preferred embodiment of the invention; however, such predictive encoding may be convenient in some cases where the encoder circuitry or functionality of a system is not readily adaptable to the preferred NULL P-frame insertion process.

At step 340, the stored group of pictures within, e.g., GOP buffer 111 is replicated. That is, data representative of the stored GOP is coupled to the output of GOP replicator 120 as video elementary stream CV. After replicating the stored GOP (step 340) the routine 300 optionally proceeds to step 345, where time stamps within the individual frames comprising the group of pictures are adjusted. For example, the presentation time stamp (PTS) and/or decode time stamp (DTS) associated with each of the frames may be adjusted to provide appropriate timing information to the resulting bitstream. For example, some decoders do not operate properly unless each frame in a bitstream has a unique and temporally consecutive PTS.

The routine 300 then proceeds to step 350, where a query is made as to whether additional groups of pictures are required to fill in the output bitstream. That is, the query at step 350 is used to determine whether the GOPs output thus far to form the MPEG1 or MPEG2 bitstream have provided a bitstream of sufficient duration for the particular application. If the query at step 350 is answered affirmatively, then the routine proceeds to step 340. If the query at step 350 is answered negatively, the routine proceeds to step 355 and exits.

The above-described invention is depicted as operating primarily on a single image frame. However, the invention is suitable for encoding a plurality of input image frames. For example, in one embodiment of the invention, the frame encoder 110 or microprocessor 205 senses that the input image signal I has been changed. In response, the frame encoder 110 or microprocessor 205 encodes the new input image I to produce a new GOP structure in which the I-frame and NULL P-frames are based upon the new input image I.

While the invention may be utilized to encode a sequence of input images, the "image rate" is bounded by the GOP structure, the bit budget allotted to each GOP and other factors. Thus, assuming the shortest GOP (a single I-frame), the primary limiting parameter will be the bit budget of the GOP structure and the bitstream. Since 1-frames utilize a large amount of data, the invention is not suitable for high frame rate video. However, for low frame rate video applications (i.e., a very few frames per second), such as video telephony applications, the invention provides an economical method and apparatus for producing an information stream suitable for transport via a standard communication link.

Typically, approximately 40% of the bit budget of a "well behaved" MPEG video stream is utilized for coding I-frames. The subject invention advantageously utilizes approximately 98% of the bit budget of a resultant MPEG-like video stream to code I-frames. Thus, since the quality of a presented image is directly proportional to the quality of I-frame coding in a stream used to provide the image information, video streams produced using the subject invention provide a qualitative improvement of almost 250% over typical MPEG video streams.

The above-described invention provides an information stream that will produce, upon a presentation device, a substantially motionless image by forming a group of pictures (GOP) comprising an I-frame followed by a plurality of P-frames having relatively inconsequentially motion vectors. It must be noted that the P-frames may be NULL P-frames (as previously described) or P-frames that have been predicted, in the standard manner, using the initial I-frame.

In one embodiment of the invention the initial I-frame is continually replicated, rather than the GOP replication described above. An output bitstream so formed is useful where stream reentrance (i.e., random stream access) is crucial (and bandwidth considerations are not critical) such as within a video edit/production environment.

In another embodiment of the invention, the entire output information stream comprises a single GOP. That is, the output information stream comprises an I-frame formed as previously described, and however many P-frames (NULL or predicted) are necessary to fill out the time requirements of the output stream.

In another embodiment two GOPs are formed, and only the second GOP is replicated to produce the output information stream. The inventors utilized this embodiment when using an early MPEG encoder having the characteristic of "stealing" bits from the I-frame of the first GOP to produce a higher quality I-frame in the second GOP. The encoder did not "bit starve" the second I-frame to enhance a third I-frame. Thus, since the second GOP was qualitatively superior to the first GOP, the second GOP was replicated in the manner described above.

It should be noted that all the elements shown in FIG. 1 may be implemented entirely or partially in software. This is because the process of generating the MIS stream does not necessarily need to be performed in real time. In addition, the computational load on a processor running such a software implementation is greatly reduced when compared to the computational load of prior art methods.

It is important to note that while the invention has been described primarily in terms of hardware, the invention may be implemented using hardware, software or a combination of hardware and software. For example, the invention may be practiced using a computer, such as depicted in FIG. 2, capable of receiving, processing and storing information streams such as the streams described below with respect to the invention. Moreover, while the invention is described within the context of processing a video information stream (e.g., an MPEG-like stream) to produce a video of audio-video information sub-stream, the invention may be practiced using other types of information streams and for other purposes.

The above-described invention provides rapid, cost-effective generation of movie information streams. In the context of the OnSet™ interactive digital video on demand (VOD) service, the invention is used to process a large amount of content, such as movies, sporting events and the like. While the invention is advantageously employed within the context of a video on demand system, such as the previously-described OnSet™ interactive digital video on demand (VOD) service, other information processing and distribution systems may benefit from the invention.

Although various embodiments which incorporate the teachings of the present invention have been shown and described in detail herein, those skilled in the art can readily devise many other varied embodiments that still incorporate these teachings.

What is claimed is:

1. A method for processing an image to produce a compressed information stream, said method comprising the steps of:

intra-coding said image to produce an intra-coded information frame (I-frame);

associating said intra-coded information frame with a plurality of forward predicted information frames (P-frames) to form a group of pictures (GOP); and replicating said GOP to produce said compressed information stream.

2. The method of claim 1, wherein said plurality of forward predicted information frames comprise NULL P-frames.

3. The method of claim 1, wherein said step of replicating is terminated upon the production of a compressed information stream having a predetermined duration.

4. The method of claim 1, wherein said step of replicating further comprises the step of:

synthesizing, for at least an I-frame of each of said replicated GOPs, a time stamp parameter indicative of a temporal offset between said I-frames.

5. The method of claim 2, wherein said plurality of NULL forward predicted information frames (P-frames) are generating by forward prediction encoding said image using substantially zero motion vectors.

6. The method of claim 2, wherein said plurality of NULL P-frames are generating by forward prediction encoding said I-frame using zero motion vectors.

7. The method of claim 1, wherein said GOP comprises a predetermined number of P-frames, said predetermined number being selected to provide a predetermined duration to said GOP.

8. The method of claim 7, wherein said predetermined duration of said GOP approximates a desired presentation duration of said image.

9. The method of claim 1, wherein:

said I-frame is associated with a presentation time stamp having a first value;

each of said P-frames associated with said I-frame are associated with respective temporally sequential presentation time stamps; and said step of replicating includes the step of updating each of said presentation time stamps such that said output information stream comprises a sequence of I-frames and associated P-frames having respective temporally sequential presentation time stamps.

10. A method for generating an information stream for providing, on a presentation device, a relatively motionless image, said method comprising the steps of:

encoding, using a preferential bit allocation determined with respect to a group of pictures (GOP) bit budget, an image to produce an intra-frame (I-frame) encoded video information frame;

associating said intra-frame encoded video information frame with a plurality of substantially zero motion vector forward predicted (P-frame) information frames; and replicating at least one of said substantially zero motion vector P-frames to form said information stream.

11. The method of claim 10, wherein said step of replicating comprises the step of replicating said I-frame and a plurality of said P-frames, where said I-frame and said plurality of P-frames form a GOP.

12. The method of claim 10, wherein:

said I-frame is associated with a presentation time stamp having a first value;

each of said P-frames associated with said I-frame are associated with respective temporally sequential presentation time stamps; and said step of replicating includes the step of updating each of said presentation time stamps such that said output information stream comprises a sequence of I-frames and associated P-frames having respective temporally sequential presentation time stamps.

13. Apparatus for processing an image to produce an MPEG-like information stream, comprising:

a frame encoder, for producing an intra-coded (I-frame) in response to said image, and for producing N number of forward predicted information frames (P-frames) in response to said I-frame, where N is an integer;

a memory, for storing said I-frame and said N number of P-frames; and a controller, for causing said memory to repetitively output said I-frame and said N number of P-frames as a video elementary stream.

14. The apparatus of claim 13, wherein said I-frame and said N number of P-frames form a group of pictures (GOP) structure.

15. The apparatus of claim 13, wherein said plurality of forward predicted information frames comprise NULL P-frames.

16. The apparatus of claim 13, wherein said controller causes said memory to repetitively output said I-frame and said N number of P-frames until a video elementary stream having a predetermined duration is formed.

17. The apparatus of claim 13, wherein said controller synthesizes, for at least said replicated I-frames, a time stamp parameter indicative of a temporal offset between said I-frames.

18. The apparatus of claim 15, wherein said plurality of NULL forward predicted information frames (P-frames) are generating by forward prediction encoding said image using substantially zero motion vectors.

19. The apparatus of claim 14, wherein said predetermined duration of said GOP approximates a desired presentation duration of said image.

20. The apparatus of claim 13, wherein:

said I-frame is associated with a presentation time stamp having a first value;

each of said P-frames associated with said I-frame are associated with respective temporally sequential presentation time stamps; and said controller updates each of said presentation time stamps such that said output elementary stream comprises a sequence of I-frames and associated P-frames having respective temporally sequential presentation time stamps.

21. The apparatus of claim 13, further comprising:

a multiplexer, for multiplexing said video elementary stream and an audio elementary stream to produce a program stream.

* * * * *